Feb. 24, 1942.    J. E. GRASS    2,273,954
DRILL JIG
Filed May 8, 1939
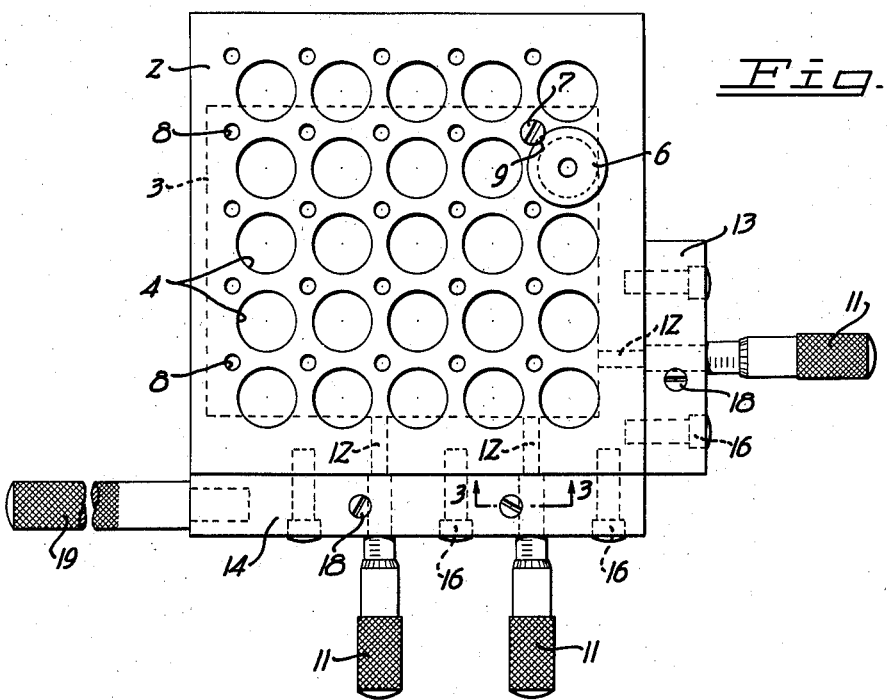
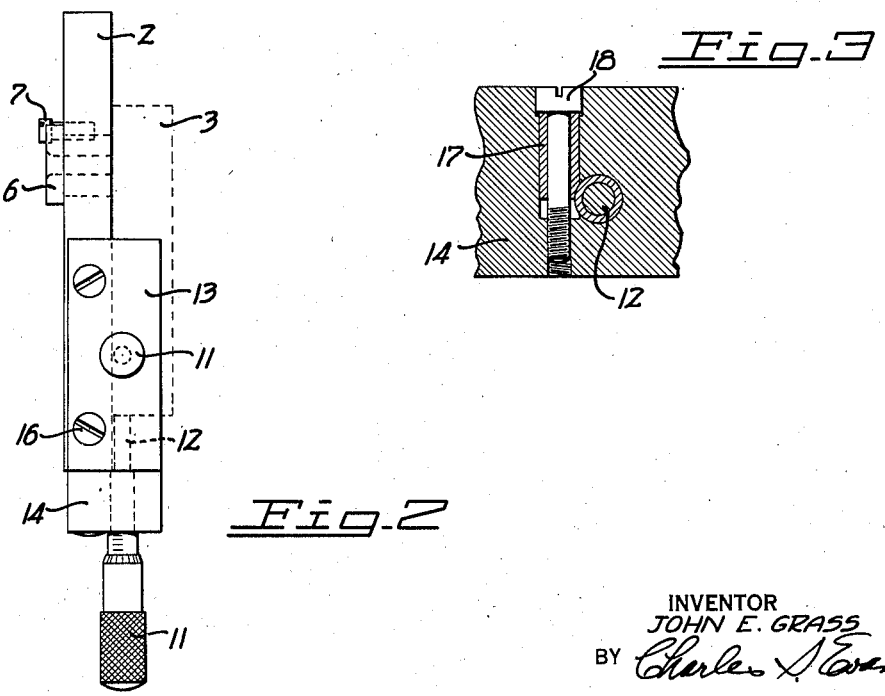
INVENTOR
JOHN E. GRASS
BY Charles A. Evans
HIS ATTORNEY Patented Feb. 24, 1942

2,273,954

UNITED STATES PATENT OFFICE 2,273,954

DRILL JIG

John E. Grass, Atherton, Calif.

Application May 8, 1939, Serial No. 272,465

2 Claims. (Cl. 77—62)

My invention relates to a jig for locating drill holes in work, such as a die block, where great accuracy is desirable.

It is among the objects of my invention to provide a drill jig with which a drill may be quickly and accurately positioned relative to the work.

Another object is to provide micrometer means for adjustably positioning the work on the jig.

A further object is to provide a jig plate having a multiplicity of drill guide apertures relative to which the work may be adjustably positioned, whereby a drill may be quickly located in desired position.

A still further object is to provide a collet mountable in a selected guide aperture for centering the drill.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view of my drill jig; and

Figure 2 is a side elevational view of the same.

Figure 3 is a detail sectional view, taken in a plane indicated by line 3—3 of Figure 1.

In terms of broad inclusion, my drill jig comprises a plate for overlying the work to be drilled and having a drill guide aperture, and means on the plate for adjustably positioning the work relative to the aperture. A multiplicity of the guide apertures are preferably provided in rows running longitudinally and transversely of the plate, and adjustment is preferably effected by micrometers arranged to shift the work along the rows. A collet is also preferably mountable in a selected aperture for centering the drill.

In greater detail, and referring to the drawing, my improved drill jig comprises an apertured plate 2 overlying a die block 3 or other work to be drilled. The plate has a multiplicity of drill guide apertures 4 arranged in rows running longitudinally and transversely of the plate. The rows in each direction are parallel, and the apertures are equally spaced along the rows. For example, Figure 1 shows a plate having five rows each way, with five apertures to a row, making twenty-five apertures in all. The centers of the apertures are preferably spaced one inch along each row and the rows along the right hand and lower edges of the plate are also spaced one inch from the latter edges.

The drill is centered in a selected guide aperture by a collet 6 removably mounted in the aperture and locked by a screw 7. A tapped hole 8 is provided adjacent each aperture 4 for receiving the locking screw. The screw preferably engages a notch 9 in the rim flange of the collet to lock the latter against outward and turning movements. Collet 6 is preferably hardened and ground. A plurality of collets with different sized holes are provided for different drills. For smaller sizes, drills with reduced extensions may be provided. By reason of the multiplicity of guide apertures, one of the latter will be in the vicinity of the point to be drilled. Therefore, collet 6 of proper size for the drill to be used is placed in the nearest guide aperture, and final adjustment is made by shifting the work 3.

The adjustment means preferably comprises a plurality of micrometers 11 having spindles 12 for engaging sides of the work. A three point engagement with the work is secured by mounting one micrometer on a flange 13 along one side of plate 2, and two other micrometers on a flange 14 along an adjacent side of the plate. Mounting flanges 13 and 14 are preferably disposed along the right hand and lower edges of plate 2, and are secured by suitable screws 16. Micrometers 11 are of ordinary construction, and are preferably set so that they read zero when the sides of the work register with the centers of the apertures along the rows closest to the micrometers. The micrometers have a spindle adjustment of one inch, thus giving full coverage over the work, since the center of each aperture may be adjustably shifted across the full distance between the rows.

Figure 1 shows the work set up for drilling a hole at a point spaced three-eighths inch from the right hand edge of the work and three and one-fourth inches from the lower edge. The second aperture from the top in the right hand row is the closest, so this one is used. The right hand micrometer is then backed off three-eighths inch, and the lower micrometers are backed off one-fourth inch.

The micrometers are preferably locked in mounted position by notched sleeves 17 pressed against the spindle casings by screws 18. A suitable handle 19 is also preferably provided for convenience in handling the jig. After adjustments have been made the work is preferably held to plate 2 for drilling by suitable clamps (not shown). The jig is also useful for accurate reaming.

I have found that the one inch spacing between the centers of guide apertures 4 is a convenient unit of measure for locating holes to be drilled; and with such spacing the apertures are preferably of thirteen-sixteenths inch diameter. With guide apertures of this size, collets with different sized holes are preferably provided to take drills ranging from three-sixteenths to five-eighths inch. As already mentioned, still smaller drill sizes may be used by employing drills with reduced extensions. When holes larger than five-eighths inch are desired a smaller sized hole may first be drilled with the use of my jig and the hole subsequently enlarged by suitable means. The above arrangement gives a range of drill sizes sufficient for most die work. It is understood however that other sizes and arrangements of guide apertures 4 may be employed.

My jig is also useful as an inspection tool for checking holes in a piece of work. Thus a plug may be placed in a hole and the work set up in the jig with the projecting plug engaging a collet sized to fit it. The micrometers are then set up and readings taken to determine accurately the position of the hole being checked.

Throughout the specification and claims I have used the term "collet" to define the annular ring between the drill and apertured plate. Mechanics variously refer to such rings as collets, bushings, collars and sleeves.

I claim:

1. A drill jig comprising a plate for overlying the work to be drilled and having a drill guide aperture, and micrometer means on the plate and having a spindle bearing directly against the work for adjustably positioning the work relative to said aperture.

2. A drill jig comprising a plate for overlying the work to be drilled and having a drill guide aperture, and a plurality of micrometers on the plate for adjustably positioning the work relative to said aperture, said micrometers being arranged so that a spindle of one directly engages one side of the work and spindles of two others directly engage an adjacent side of the work.

JOHN E. GRASS.